(12) United States Patent
Hwang et al.

(10) Patent No.: US 10,318,234 B2
(45) Date of Patent: Jun. 11, 2019

(54) DISPLAY APPARATUS AND CONTROLLING METHOD THEREOF

(71) Applicant: Samsung Electronics Co., Ltd., Suwon-si, Gyeonggi-do (KR)

(72) Inventors: In-woo Hwang, Gunpo-si (KR); Sun-min Kim, Yongin-si (KR); Jae-youn Cho, Suwon-si (KR); Ki-woong Kang, Suwon-si (KR); Ki-beom Kim, Yongin-si (KR); Hae-kwang Park, Suwon-si (KR); Dong-hyun Lim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/046,038

(22) Filed: Jul. 26, 2018

(65) Prior Publication Data
US 2019/0050193 A1    Feb. 14, 2019

(30) Foreign Application Priority Data
Aug. 9, 2017   (KR) ........................ 10-2017-0101264

(51) Int. Cl.
*H04R 29/00*   (2006.01)
*H03G 3/30*   (2006.01)
(Continued)

(52) U.S. Cl.
CPC ............. *G06F 3/165* (2013.01); *H04R 1/025* (2013.01); *H04R 3/00* (2013.01); *H04N 5/60* (2013.01);
(Continued)

(58) Field of Classification Search
CPC ........... G06F 3/165; H04R 1/025; H04R 3/00; H04R 2430/01; H04R 2499/15; H04N 5/60
See application file for complete search history.

(56) References Cited

U.S. PATENT DOCUMENTS

| | | |
|---|---|---|
| 9,391,579 B2 | 7/2016 | Walsh et al. |
| 2008/0089524 A1 | 4/2008 | Takeuchi |

(Continued)

FOREIGN PATENT DOCUMENTS

| | | |
|---|---|---|
| JP | 2006-186920 | 7/2006 |
| JP | 4306708 | 5/2009 |

(Continued)

OTHER PUBLICATIONS

English machine translation of KR 10-2007-0063222 (Park; Method for Auto Setting Video and Audio Mode of Digital Television; published Jun. 2007).*

(Continued)

*Primary Examiner* — Mark Fischer
(74) *Attorney, Agent, or Firm* — Staas & Halsey LLP

(57) ABSTRACT

A display apparatus includes a speaker, a storage configured to store first rendering type information and second rendering type information based on a volume level of each content genre; a display, and a processor configured to render a sound signal of a content based on at least one of the first rendering type information and the second rendering type information corresponding to a genre of the content on the display and output the rendered sound signal through the speaker, wherein the processor, based on a volume level which is currently set in the display apparatus being within a predetermined range, renders the sound signal based on third rendering type information which is obtained by applying a weight according to the set volume level to at least one (Continued)

of the first rendering type information and the second rendering type information.

17 Claims, 9 Drawing Sheets

(51) Int. Cl.
    *G06F 3/16*     (2006.01)
    *H04R 1/02*     (2006.01)
    *H04R 3/00*     (2006.01)
    *H04N 5/60*     (2006.01)

(52) U.S. Cl.
    CPC ...... *H04R 2430/01* (2013.01); *H04R 2499/15* (2013.01)

(56) References Cited

U.S. PATENT DOCUMENTS

2014/0003623 A1    1/2014   Lang
2014/0240595 A1    8/2014   DiNunzio
2017/0070817 A1    3/2017   Seo et al.

FOREIGN PATENT DOCUMENTS

| JP | 2016-66832 | | 4/2016 |
|----|------------|---|--------|
| KR | 10-2003-0000312 | | 1/2003 |
| KR | 20070063222 A | * | 6/2007 |
| KR | 10-2007-0119177 | | 12/2007 |
| KR | 10-2011-0085682 | | 7/2011 |
| KR | 10-1726208 | | 4/2017 |
| WO | 2014/160542 | | 10/2014 |

OTHER PUBLICATIONS

International Search Report and Written Opinion of the International Searching Authority dated Nov. 28, 2018, in International Patent Application No. PCT/KR2018/008820.

* cited by examiner

DISPLAY APPARATUS AND CONTROLLING METHOD THEREOF

CROSS-REFERENCE TO RELATED APPLICATIONS

This application is based on and claims priority under 35 U.S.C. § 119 to Korean Patent Application No. 10-2017-0101264, filed on Aug. 9, 2017, in the Korean Intellectual Property Office, the disclosure of which is incorporated by reference herein in its entirety.

BACKGROUND

1. Field

Apparatuses and methods consistent with exemplary embodiments of the present disclosure relate to a display apparatus and a controlling method thereof and, more particularly, to a display apparatus which outputs a rendered sound signal and a controlling method thereof.

2. Description of the Related Art

Recent development of electronic technology has led to development and spread of various types of electronic devices. In particular, an electronic apparatus having a speaker such as a display apparatus and an audio output apparatus applies various rendering techniques to contents to satisfy expectation of a user at the time of listening to a sound signal.

For example, a display apparatus performs rendering so that the contents of the news, current affairs, and documentary genres are to be emphasized so as to emphasize the voice transmission power, and the rendering is performed so that the movie emphasizes three-dimensional feeling, music plays a high reproduction band, and sports emphasizes presence feeling. Accordingly, a user can listen to the sound signal rendered differently according to different genres of contents, and receive various user experiences.

However, since the current display apparatus maintains a fixed rendering policy for each genre of content, there is a problem that a user's listening level according to the current volume level of the display apparatus is not considered. For example, even at low volume levels, the content of the sports genre is rendered to emphasize the presence only, so that the user could not properly listen to the narrator's voice.

SUMMARY

Exemplary embodiments address at least the above problems and/or disadvantages and other disadvantages not described above. Also, the exemplary embodiments are not required to overcome the disadvantages described above, and may not overcome any of the problems described above.

The present disclosure includes one or more exemplary embodiments that may address and/or solve the above-mentioned needs, and it is an object of the one or more exemplary embodiments of the present disclosure to provide a display apparatus which renders a sound signal based on a genre of a content and a volume setting level of a display apparatus to provide a user with an optimized sound, and a controlling method thereof.

According to an exemplary embodiment, there is provided a display apparatus which includes a speaker; a storage configured to store first rendering type information and second rendering type information based on a volume level of each content genre; a display; and a processor configured to render a sound signal of a content displayed on the display based on at least one of the first rendering type information and the second rendering type information corresponding to a genre of the content, and output the rendered sound signal through the speaker, wherein the processor is further configured to, based on a set volume level in the display apparatus being within a predetermined range, render the sound signal based on third rendering type information which is obtained by applying a weight according to the set volume level to at least one of the first rendering type information and the second rendering type information.

The processor may, based on the set volume level exceeding the predetermined range, render the sound signal based on the first rendering type information, and based on the set volume level being less than the predetermined range, render the sound signal based on the second rendering type information.

The processor may, based on the set volume level being within the predetermined range, obtain the third rendering type information by applying a first weight to the first rendering type information and a second weight to the second rendering type information based on the set volume level.

The processor is configured to, based on the set volume level being within the predetermined range and approaching to a lower limit of the predetermined range relative to an upper limit of the predetermined range, set the second weight to be greater than the first weight, and based on the set volume level being within the predetermined range and approaching to the upper limit of the predetermined range relative to the lower limit of the predetermined range, set the first weight to be greater than the second weight.

The information regarding the predetermined range of each content genres is stored in the storage, and wherein the processor identifies the predetermined range which corresponds to a genre of the content based on the stored information.

The processor may obtain the weight based on the set volume level and a hearing level, and the hearing level is obtained based on at least one of an average viewing distance of a user to the display apparatus, a content viewing time, a size of the sound signal, and an ambient noise level.

Each of the first rendering type information and the second rendering type information is parameter information to adjust at least one of a voice transmission power, a low frequency range, a reproduction band, a presence, and a sense of space.

The genre of the displayed content may be included in the content or obtained based on the sound signal.

According to an exemplary embodiment, there is provided a controlling method of a display apparatus in which first rendering type information and second rendering type information based on a volume level of each content genre is stored therein. The method may include obtaining first rendering type information and second rendering type information corresponding to a genre of an input content; rendering a sound signal of the content based on at least one of the first rendering type information and the second rendering type information; and outputting the rendered sound signal, wherein the rendering may include, based on a set volume level in the display apparatus being within a predetermined range, rendering the sound signal based on third rendering type information which is obtained by applying a weight according to the set volume level to at least one of the first rendering type information and the second rendering type information.

The rendering may include, based on the set volume level exceeding the predetermined range, rendering the sound signal based on the first rendering type information, and based on the set volume level being within the predetermined range, rendering the sound signal based on the second rendering type information.

The rendering may include, based on the set volume level being less than the predetermined range, obtaining the third rendering type information by applying a first weight to the first rendering type information and a second weight to the second rendering type information based on the set volume level.

The rendering may include, based on the set volume level being within the predetermined range and approaching to a lower limit of the predetermined range relative to an upper limit of the predetermined range, setting the second weight to be greater than the first weight, and based on the set volume level within the predetermined range and approaching to the upper limit of the predetermined range relative to the lower limit of the predetermined range, setting the first weight to be greater than the second weight.

The rendering may include storing information regarding the predetermined range of each content genres, wherein the rendering further comprises identifying the predetermined range which corresponds to a genre of the content based on the stored information.

The rendering may include obtaining the weight based on the set volume level and a hearing level, and wherein the hearing level is obtained based on at least one of an average viewing distance of a user to the display apparatus, a content viewing time, a size of the sound signal, and an ambient noise level.

Each of the first rendering type information and the second rendering type information is parameter information to adjust at least one of a voice transmission power, a low frequency range, a reproduction band, a presence, and a sense of space.

The genre of the displayed content may be included in the content or obtained based on the sound signal.

According to an exemplary embodiment, there is provided a non-transitory computer-readable medium which stores a computer instruction to cause a display apparatus to perform processing operations when executed by a processor. Herein, the operations include obtaining first rendering type information and second rendering type information corresponding to a genre of an input content; rendering a sound signal of the content based on at least one of the first rendering type information and the second rendering type information, wherein the rendering comprises, based on a set volume level in the display apparatus being within a predetermined range, rendering the sound signal based on third rendering type information which is obtained by applying a weight according to the set volume level to at least one of the first rendering type information and the second rendering type information.

According to various embodiments of the present disclosure, it is possible to provide a user with a certain level of listening ability by rendering different characteristics, from among various characteristics of a sound signal, to be emphasized according to the genre of the content and the volume setting value of the display apparatus.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
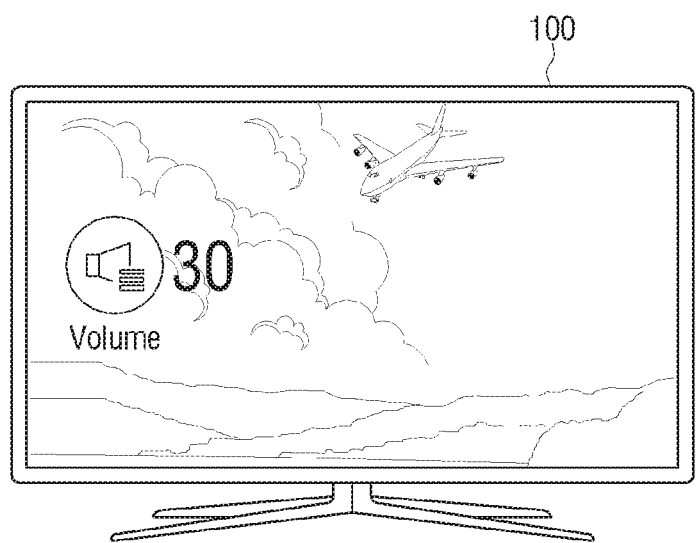
FIG. 1 is a view illustrating an example of a display apparatus according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments may be practiced without those specifically defined matters. Also, well-known functions or constructions are not described in detail since they would obscure the description with unnecessary detail.

A singular expression includes a plural expression, unless otherwise specified. It is to be understood that the terms such as "comprise" or "consist of" are used herein to designate a presence of characteristic, number, step, operation, element, component, or a combination thereof, and not to preclude a presence or a possibility of adding one or more of other characteristics, numbers, steps, operations, elements, components or a combination thereof.

FIG. 1 is a view illustrating an example of a display apparatus according to an exemplary embodiment.

Referring to FIG. 1, a display apparatus 100 may be implemented as a digital TV having at least one speaker. However, the present disclosure is not limited thereto and can be implemented in various types of devices having display functions such as a PC, a mobile phone, a tablet PC, a portable multimedia player (PMP), a portable multimedia player (PDA), and a navigation device. Further, it goes without saying that the various embodiments of the present disclosure are applicable to an electronic apparatus including at least one speaker unit such as an audio apparatus, a sound bar, a home theater system, and a room speaker without a display function. Here, the speaker unit has a function of converting electric pulses into sound waves, and can be realized as, for example, a dynamic type according to a principle and a method of converting electric signals into sound waves. However, the present disclosure is not limited thereto, and it may be implemented as an electrostatic type, a dielectric body type, a magnetostrictive type, or the like within the scope of the present disclosure. Hereinafter, it is assumed that the display apparatus 100 is implemented as a digital TV for convenience of description.

The display apparatus 100 can receive various genres of contents according to an embodiment. Here, the contents of various genres refer to kinds of contents such as movies, soap operas, sports, news, and music. The genres of contents may be represented by characteristics, type, category, etc. of contents, but are generally referred to as the genres of contents.

Meanwhile, according to an embodiment of the present disclosure, the display apparatus 100 may acquire rendering type information based on genres of contents and volume level which is currently set in the display apparatus 100, and output a sound signal based on the acquired rendering type information. Hereinafter, various embodiments of the present disclosure will be described with reference to the drawings.

Figure 2:
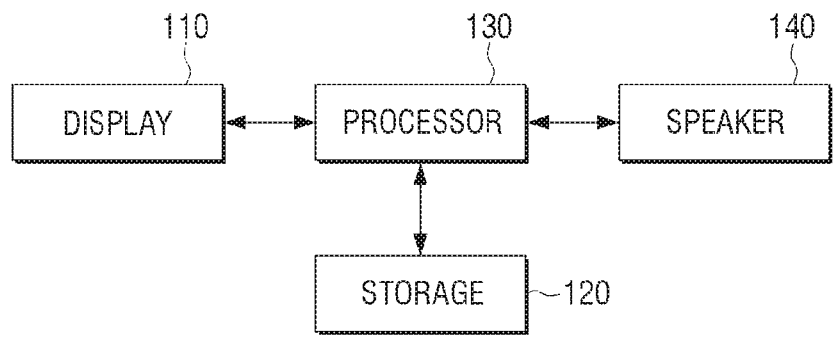
FIG. 2 is a block diagram illustrating a configuration of a display apparatus according to an exemplary embodiment.

FIG. 2 is a block diagram illustrating a configuration of a display apparatus according to an exemplary embodiment.

According to FIG. 2, the display apparatus 100 includes a display 110, a storage 120, a processor 130, and a speaker 140.

The display 110 may provide various content screens that can be provided through the display apparatus 100. Here, the content screen may include various contents such as an image, a video, a text, music, etc., an application execution screen including various contents, a graphic user interface (GUI) screen and so on.

Meanwhile, the display 110 may be implemented as various types of displays such as a liquid crystal display, an organic light-emitting diode, a liquid crystal on silicon (LCoS), a digital light processing (DLP) and the like. Also, the display 110 may be implemented as a transparent display that is made of a transparent material and displays information. Meanwhile, the display 110 may be implemented as a touch screen having a mutual layer structure with the touch pad. In this case, the display 110 may be used as a user interface in addition to an output device.

The storage 120 may store various data, programs, or applications for driving and controlling the display apparatus 100.

In particular, the storage 120 may store rendering type information for each content genre according to an embodiment of the present disclosure. Here, the rendering type information may be parameter information for providing various effects to the sound signal of the content. For example, the rendering type information may include information on parameter setting values for emphasizing at least one of a sound transmission power, a reproduction band, a low frequency range, a sense of space, and presence. Here, the sound signal may be a digital sound signal, but is not limited thereto.

According to an embodiment, a plurality of types of rendering information may be matched and stored in one genre. For example, the first rendering type information and the second rendering type information may correspond to the sports genre. Here, the first rendering type information may be information used when the volume level set in the display apparatus 100 exceeds an upper limit (hereinafter referred to as a first level) of a predetermined volume level range. In addition, the second rendering type information may be information used when the volume level set in the display apparatus 100 is less than a lower limit (hereinafter referred to as a second level) of a predetermined volume level range. However, the rendering type information matched by genre is not limited to two, and two or more rendering type information may be matched. In addition, the storage 120 may store rendering type information corresponding to a sub-genre, as well as rendering-type information per genre. For example, the storage 120 may store a plurality of rendering type information corresponding to various sub-genres such as horror, melodrama, action, war, and SF in the movie genre.

Here, the volume level set on the display apparatus means a volume level corresponding to the volume set by the user among the volume levels that the display apparatus 100 can provide. The plurality of volume levels that can be provided in the display apparatus 100 may differ depending on the characteristics of the display apparatus 100, for example, a manufacturer, a type, model, and the like. That is, different volume levels (for example, sound pressure level (SPL)) may be mapped to the same volume (for example, 10) for each characteristic of the display apparatus 100. Hereinafter, for convenience of description, the dBSPL value corresponding to the current volume of the display apparatus 100 is referred to as the volume level currently set in the display apparatus.

The processor 130 controls the overall operation of the display apparatus 100. The processor 130 may include one or more of a digital signal processor (DSP), a central processing unit (CPU), a controller, an application processor (AP), or a communication processor (CP)), an ARM processor, or may be defined by a corresponding term.

In particular, the processor 130 may obtain the first and second rendering type information corresponding to the genre of the content displayed on the display 110 from the storage 120. However, the present disclosure is not limited thereto, and it is needless to say that at least one rendering type information corresponding to the genre of the content can be obtained from an external server, metadata regarding a content, and so on.

The processor 130 according to an embodiment of the present disclosure may render the sound signal of the content based on at least one of the first rendering type information and the second rendering type information corresponding to the genre of the content displayed on the display 110. Here, if the set volume level is within a predetermined volume level range, the processor 130 applies a weight according to the currently set volume level to at least one of the first rendering type information and the second rendering type information, to obtain third rendering type information, and render the sound signal based on the third rendering type information.

For example, if the predetermined volume level range is 40 dBSPL to 80 dBSPL and the set volume level of the display apparatus 100 is 50 dBSPL, the first and second weights may be respectively applied and summed to the first rendering type information and the second rendering type information corresponding to the genre of content, and the third rendering type information can be obtained.

Meanwhile, the predetermined volume level range is not limited to 40 dBSPL to 80 dBSPL, and the predetermined volume level range may be set differently according to a user setting, manufacturer's setting, viewing time, content genre, and the like. As an example, at evening and early morning hours, the lower and upper limits of the volume level range set at 40 dBSPL and 80 dBSPL, respectively, can be adjusted to reflect the human auditory system, which is relatively sensitive at evening and early morning hours. For example, at evening and early morning hours, the predetermined volume level range can be adjusted from 35 dBSPL to 75 dBSPL.

In the meantime, the processor 130, when a volume level which is set in the display apparatus 100 exceeds a predetermined volume level range, may perform rendering of a sound signal of a content based on one of first rendering type information and second rendering type information corresponding to the displayed genres of contents.

For example, if the set volume level exceeds 80 dBSPL, the processor 130 may render the sound signal based on the first rendering type information corresponding to the content genre. The first rendering type information may include a rendering parameter setting value to emphasize the genre characteristic of the corresponding content in the audio signal of the corresponding content. Here, the genre characteristic may mean a sound effect that the user generally expects in the genre of the content.

When a user views content with a relatively high volume, in general, the user may desire to be provided with a sound effect reflecting genre characteristics of the content. Accordingly, in the present disclosure, when the setting volume level of the display apparatus 100 exceeds the first level, that is, the volume level of the predetermined threshold value, the sound signal is rendered based on the first rendering type information, and the desired effect can be provided at the corresponding volume level.

For example, in the case of sports genre content, the first rendering type information may include a parameter setting value for rendering the sound signal to be emphasized such that the sense of space and the presence are relatively emphasized relative to the voice transmission power. For example, the first rendering type information corresponding to the sports genre includes information on parameter setting values for emphasizing the presence and sense of space relative to the voice transmission power, the reproduction band, and the low frequency range as shown in Table 1 below. In this case, the user can be provided with other sound effects such as a commentary voice due to a high volume setting while receiving a sound signal emphasizing presence and sense of space by a certain level or more.

TABLE 1

| Voice transmission power | Reproduction band | Low frequency range | Sense of space | Presence |
|---|---|---|---|---|
| 3 | 2 | 3 | 4 | 5 |

The processor 130 according to an exemplary embodiment of the present disclosure may render a sound signal based on the second rendering type information if the set volume level of the display apparatus 100 is less than a lower limit of a predetermined volume level range (for example, 40 dBSPL). Here, the second rendering type information may include a rendering parameter setting value for emphasizing a sound effect that falls below a predetermined level when the setting volume is lowered below a second level in the genre of the content.

If the set volume level of the display apparatus 100 is less than a lower limit of the predetermined volume level range, it means that the user is viewing the content with a relatively low volume. In this case, some effects from among various effects of the sound signal of the content may not be provided to a user properly. For example, it can be assumed that the user can not recognize 'dialogue', 'narrator's voice' and so on, which correspond to the voice transmission power, due to the low volume of the display apparatus 100. Even in this case, if the sound signal is rendered based on the fixed rendering type information for emphasizing the genre characteristic, at least one of the effects of the sound signal (for example, at least one of the voice transmission power, presence, sense of space, reproduction band, and low frequency range) can be further lowered.

In order to solve such a problem, if the set volume level of the display apparatus 100 is less than a lower limit of the predetermined volume level range, the processor 130 may render a sound signal based on the second rendering type information to emphasize a sound effect which is declined in the corresponding content genre. For example, when the set volume level is less than 40 dBSPL, the sports genre content may be rendered with the sound signal being emphasized relative to the presence and the sense of space. Thus, the user can easily listen to the voice of the narrator even in a small volume. That is, the second rendering type information corresponding to the sports genre may include information on the parameter setting values for emphasizing the voice transmission power relative to the presence, the sense of space, the reproduction band, and the low frequency range as shown in Table 2 below.

TABLE 2

| Voice transmission power | Reproduction band | Low frequency range | Sense of space | Presence |
|---|---|---|---|---|
| 5 | 2 | 2 | 2 | 2 |

Hereinbelow, when the currently set volume level of the display apparatus 100 is within a predetermined volume level range, various exemplary embodiments of acquiring the third rendering type information based on the first rendering type information and the second rendering type information will be described.

The processor 130 according to an exemplary embodiment of the present disclosure may be configured such that if the set volume level of the display apparatus 100 is within a predetermined volume level range, the first and second weights are summed up and applied to each of the first and second rendering type information corresponding to the content and the third rendering type information can be obtained. For example, the processor 130, when the set volume level approaches to a lower limit (that is, the second level) than an upper limit (that is, the first level) of the predetermined volume level range, may set the second weight to be greater than the first weight. For example, if the predetermined range is 40 dBSPL to 80 dBSPL and the set volume level of the display apparatus 100 is 50 dBSPL, the processor 130 may apply a weight of 0.75 to the second rendering type information and a weight of 0.25 to the first rendering type information. For example, in the case of the sports genre content, if the first and second render type information are added after the weight of 0.25 is applied to the first render type information and the weight of 0.75 is applied to the second render type information, the third rendering type information can be obtained as Table 3 below.

TABLE 3

| Voice transmission power | Reproduction band | Low frequency range | Sense of space | Presence |
|---|---|---|---|---|
| 4.5 | 2 | 2.25 | 2.5 | 2.75 |

Also, when the set volume level of the display apparatus 100 approaches the upper limit (first level) relative to the lower limit (i.e., the second level) of the predetermined volume level range, the first weight may be set to be higher than the second weight. For example, if the predetermined volume level range is 40 dBSPL to 80 dBSPL and the set volume level of the display apparatus 100 is 70 dBSPL, the processor 130 may apply a weight of 0.75 to the first rendering type information and a weight of 0.25 to the second rendering type information. That is, the weight can be calculated based on the following Equation 1.

$$\frac{(SPL_{max} - SPL_{est})}{(SPL_{min})} \quad \text{[Equation 1]}$$

Here, $SPL_{max}$ indicates a upper limit of the predetermined volume level range, $SPL_{est}$ indicates the currently set volume level or hearing level which is currently set in the display apparatus 100, and $SPL_{min}$ indicates a lower limit in the predetermined volume level.

The processor 130 according to an exemplary embodiment of the present disclosure may render the sound signal by using a voice emphasis filter (or center sound rendering filter), sound effect emphasis filter (or background sound rendering filter), music emphasis filter and so on, when rendering the sound signal to emphasize at least one of the voice transmission power, reproduction band, low frequency range, sense of space, and presence. In this case, various filters such as a hi-pass filter, a low-pass filter, a band-pass filter, a mask filter, a head-related transfer function (HRTF) filter, and so on, can be used. Here, the sound signal for which the processor 130 performs rendering can be a plurality of channel signals (for example, a stereo signal). However, the present disclosure is not limited thereto, and the sound signal may be included in the sound content itself or may be a part of the video content. According to an exemplary embodiment, any signal which can be divided into a center signal and an ambient signal is applicable.

In a case where the voice emphasis filter is to be applied according to an embodiment, when the input sound signal is a stereo signal, the processor 130 may divide a stereo signal into a center (or a primary, hereinafter referred to as a first sound signal) and an ambient (reverberation, applause, wind, various background sounds) signal (hereinafter referred to as a second sound signal).

The processor 130, when voice is detected from the first sound signal, may apply the voice emphasis filter to the first sound signal. Accordingly, rendering can be performed so that the first sound signal is comparatively emphasized than the second sound signal and the voice transmission power can be improved.

For example, when the set volume level of the display apparatus 100 is equal to or lower than the second level, the weight of the voice emphasis filter is increased and the weight of the background sound emphasis filter is reduced because the importance of the dialogue transmission increases. When the volume level is equal to or higher than the first level, the weight of the background sound emphasis filter can be increased and the weight of the voice emphasis filter can be reduced. In addition, it is also possible to emphasize the voice transmission power by increasing the gain of the mid-range voice with respect to the low/high band gain.

In order to emphasize the reproduction band of the sound signal, the processor 130 according to an embodiment of the present disclosure may divide the sound signal into the bands of low sound, middle sound, and high sound, and enhance the signal components corresponding to the low sound and high sound. In addition, it is possible to enhance the low-frequency range by emphasizing the low-frequency range of the mid/high range.

In addition, the processor 130 may increase the gain of the sound effect (or background sound) in order to enhance the presence of the signal. For example, the processor 130 may apply a sound effect emphasis filter to the second and third sound signals to detect a sound effect in the second sound signal, thereby rendering the second sound signal. Also, a high-frequency range emphasis filter may be applied to the sound signal. Accordingly, the display apparatus 100 can output a sound signal emphasizing the sound effect and the presence. For example, the processor 130 may emphasize the presence by rendering the second sound signal including the crowded sound of the audience among the sound signals of the sports genre contents to be emphasized.

Also, the processor 130 may use at least one of a head-related transfer function (HRTF) filter and a crosstalk cancellation to emphasize the sense of space of a sound signal. For example, the two-channel crosstalk cancellation may render the sound signal output through the L channel speaker based on the transmission path of the sound signal to be transmitted only to the left ear of the user, and the sound signal output through the R channel speaker (Right ear).

Meanwhile, the processor 130 may identify a predetermined volume level range for each genre. Since the predetermined volume level range may be different for each genre, the processor 130 may identify a predetermined volume level range corresponding to the genre of the content. For example, the movie and music genres range from a predetermined volume level of 40 dBSPL to 85 dBSPL, and the sports and news/TV show genres range from a predetermined volume level of 40 dBSPL to 79 dBSPL. Meanwhile, a predetermined volume level range for each content genre may be pre-stored in the storage 120. However, the present disclosure is not limited thereto, and it is needless to say that a predetermined volume level range can be set by setting of an external server, metadata of contents, user and manufacturer. In addition, a predetermined volume level range (for example, a default volume level range) may be set regardless of the genre. As an example, the default volume level range may be 40 dBSPL (sound pressure level) to 80 dBSPL. In addition, the predetermined volume level range may be adjusted according to the viewing time. As an example, the lower and upper limits of a predetermined volume level range may be adjusted to be relatively small at a specific time zone (e.g., evening and early morning hours) when the human listening system becomes sensitive. For example, the volume level range set at 40 dBSPL to 80 dBSPL can be adjusted to 35 dBSPL-75 dBSPL at dawn when the human listening system becomes sensitive.

The processor 130 according to an exemplary embodiment may identify a genre of a content based on information of a genre included in a content and a sound signal. For example, the processor 130 may identify a genre of a content based on genre information (for example, metadata) included in a content itself.

In a case where the genre information included in the content does not exist, the processor 130 can identify the genre of the content based on the sound signal of the content. For example, it is possible to identify a frequency change amount in units of a predetermined section (hereinafter, referred to as a detection section) of a sound signal, and to identify a genre corresponding to the confirmed frequency change amount. Here, the predetermined detection interval unit may be at least one of at least one audio frame unit, at least one audio scene unit, and at least one audio chunk unit.

The processor 130 according to an embodiment of the present disclosure may obtain a weight based on the volume level and the listening level currently set in the display apparatus 100. The third rendering type information may be obtained by acquiring the weight using the listening level together with the set volume level, and applying the obtained weight to the first rendering type information and the second rendering type information. Specifically, the listening level can be obtained based on at least one of the average viewing distance of the user to the display apparatus 100, the content viewing time, and the size of the sound signal of the content. For example, as the user's average viewing distance to the display apparatus 100 increases, the user's listening level is lower than the volume level currently set in the display apparatus 100, and thus, the processor 130 may set the second weight which is applied to the second rendering type information corresponding to the low level as a comparatively greater than the first weight. A detailed description thereof will be given in FIG. 8.

The speaker 140 may output the rendered sound signal. In this case, the speaker 140 may be implemented as at least one speaker unit. In one example, the speaker 140 may include a plurality of speakers for multi-channel reproduction. For example, the speaker 140 may include a plurality of speakers serving as channels for outputting mixed sound signals. In some cases, a speaker for at least one channel may be implemented as a speaker array including a plurality of speaker units for reproducing different frequency bands.

Figure 3:
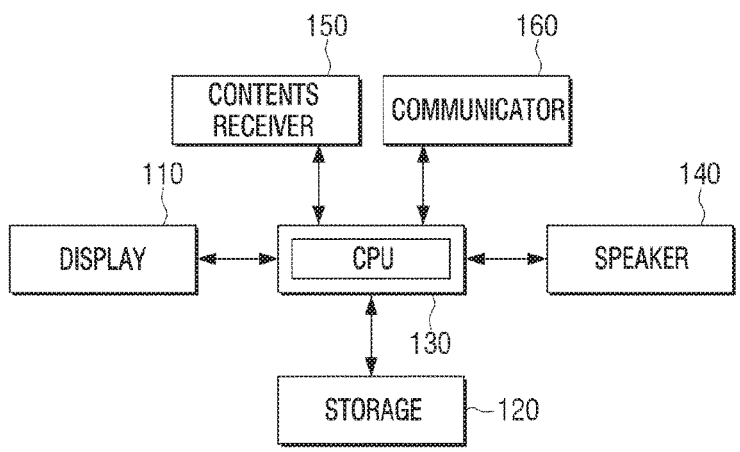
FIG. 3 is a block diagram to describe a detailed configuration of a display apparatus according to an exemplary embodiment.

FIG. 3 is a block diagram to describe a detailed configuration of a display apparatus according to an exemplary embodiment.

Referring to FIG. 3, the display apparatus 100 includes a display 110, a storage 120, a processor 130, a speaker 140, a content receiver 150, a communicator 160, a remote control signal receiver 170, and an inputter 180. The detailed description of the components shown in FIG. 3 will be omitted for the parts overlapping the components shown in FIG. 2.

The processor 130 may render a sound signal of a content based on the rendering type information which is stored in the storage 120.

The processor 130 according to one embodiment of the present disclosure may include a CPU, a ROM (or nonvolatile memory) storing a control program for controlling the display apparatus 100, RAM (or volatile memory) used as a storage area for storing data or corresponding to various operations performed in the display apparatus 100.

The CPU, by accessing the storage 120, performs booting using the O/S stored in the storage 120. By using various programs, contents, and data stored in the storage 120, the CPU performs various operations.

Here, the storage 120 may be implemented as an internal memory such as a ROM or a RAM included in the processor 130, or may be implemented as a memory separate from the processor 130. In this case, the storage 120 may be implemented as a memory embedded in the display apparatus 100 or a memory which can be attached to/detached from the display apparatus 100 depending on the purpose of data storage. For example, data for driving the display apparatus 100 may be stored in a memory embedded in the display apparatus 100, and data for an extension function of the display apparatus 100 may be stored in the memory which can be attached to and detached from the display apparatus 100. The memory embedded in the display apparatus 100 may be implemented in the form of a nonvolatile memory, a volatile memory, a hard disk drive (HDD), or a solid state drive (SSD), and a memory which can be attached to or detached from the sound output apparatus 100 can be implemented as a memory card (for example, a micro SD card, a USB memory or the like) and an external memory (for example, a USB memory) connectable to a USB port, or the like.

The content receiver 150 may be implemented as a tuner for receiving broadcast content, but it is not limited thereto and may be implemented as various types of communication modules capable of receiving various external contents such as a Wi-Fi module, a USB module, and an HDMI module. For example, the content receiver 150 may include a tuner, a demodulator, an equalizer, a demultiplexer, and the like. The content receiver 150 tunes the broadcast channel under the control of the processor 130, receives the broadcast signal desired by the user, demodulates and equalizes the received broadcast signal, and then converts the broadcast signal into a video signal, a sound signal, and additional data, etc.

The demuxed video signal is provided to the processor 130. The processor 130 performs various image processing such as noise filtering, frame rate conversion, and resolution conversion on the provided video signal, and generates a frame to be output on the screen.

The demuxed sound signal is provided to the processor 130. In the processor 130, various processes such as decoding or amplification of a sound signal, noise filtering, and the like can be performed. That is, the processor 130 may perform rendering on the sound signal in accordance with various embodiments of the present disclosure.

The communicator 160 can transmit/receive a sound signal. For example, the communicator 160 may receive a sound signal through streaming or downloading from an external apparatus (e.g., a source device), an external storage medium (e.g., universal serial bus (USB)), an external server (e.g., a webhard) through communication methods such as an AP-based Wi-Fi, a Bluetooth, a Zigbee, a wired/wireless local area network (LAN), a wide area network (WAN), Ethernet, IEEE (Institute of Electrical and Electronics Engineers) 1394, high definition multimedia interface (HDMI), universal serial bus (USB), mobile high-definition link (MHL), advanced encryption standard (AES)/European broadcasting union (EBU), optical, coaxial, and so on.

The remote control signal receiver (not shown) receives a remote control signal transmitted from a remote controller. The remote control signal receiver 170 may be configured to include a light receiver for receiving infra red (IR) signal, or may be configured to receive a remote control signal by performing communication according to a wireless communication protocol such as a remote controller and Bluetooth or Wi-Fi.

The inputter (not shown) may be implemented by various buttons provided on the main body of the display apparatus 100. The user can input various user commands through the inputter 180 such as a turn-on/turn-off command, a channel conversion command, a volume control command, a menu confirmation command and so on.

Meanwhile, the inputter according to an embodiment of the present disclosure can control rendering according to various embodiments of the present disclosure in response to a user's input to an inputter. In one example, if the user input through the inputter corresponds to rendering-on, the processor 130 may render the sound signal based on the first and second rendering type information. In addition, when the user input corresponds to the rendering-off, it is possible to render the sound signal based on any one of the first and second rendering type information. For example, when the rendering-off command is input, the processor 130 may render the sound signal based only on the first rendering type information.

Hereinbelow, the predetermined volume level range by genres of contents and rendering type information will be described in a greater detail.

Figure 4:
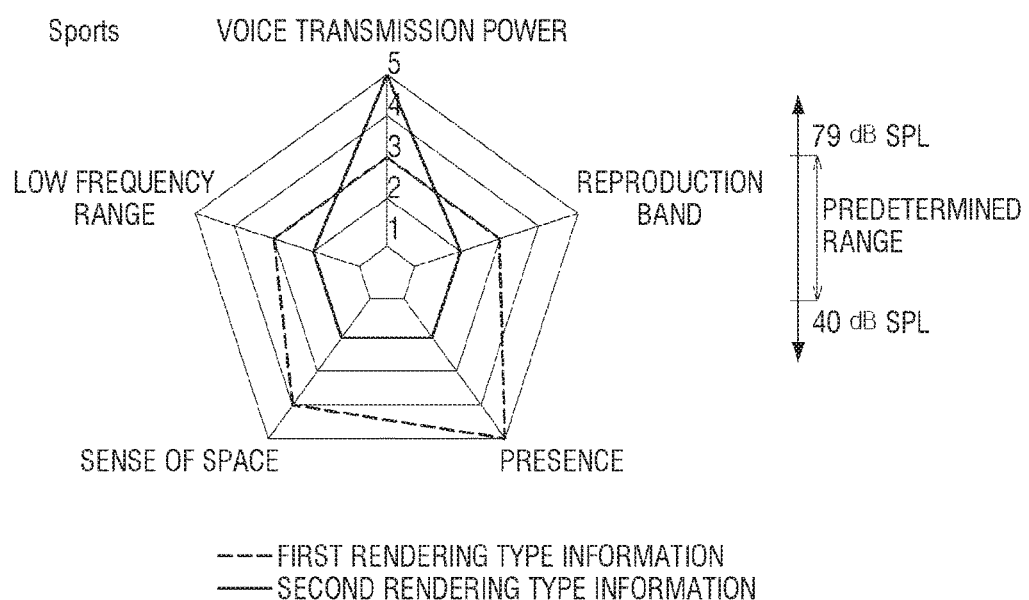
FIG. 4 is a view to describe rendering type information of a sports genre content according to an exemplary embodiment.

FIG. 4 is a view to describe rendering type information of a sports genre content according to an exemplary embodiment.

As illustrated in FIG. 4, the rendering type information of the sports genre can be divided into the first rendering type information and the second rendering type information.

For example, the display apparatus 100 may render a sound signal based on the first rendering type information when the currently set volume level of the display apparatus 100 exceeds an upper limit of a predetermined volume level range. According to the first rendering type information, if performing rendering of the sound signal of the sports genre content, rendering can be performed such that the presence is relatively emphasized relative to the remaining voice transmission power, reproduction band, low frequency range, and sense of space.

In addition, the display apparatus 100 may render an sound signal based on the second rendering type information when the currently set volume level of the display apparatus 100 is less than a lower limit of a predetermined volume level range. According to the second rendering type information, the rendering can be performed so that the voice transmission power is relatively emphasized compared to the remaining reproduction band, low frequency, sense of space, and presence.

If the current set volume level of the display apparatus 100 is within the predetermined volume level range, the display apparatus 100 applies the different weights to the first and second rendering type information to acquire the third rendering type information. Further, it is possible to render the sound signal based on the obtained third rendering type information. For example, as shown in FIG. 4, the content of the sports genre has a predetermined volume level range of 40 dBSPL to 79 dBSPL, and if the currently set volume level of the display apparatus 100 is 40 dBSPL to 79 dBSPL, the display apparatus 100 may apply the first weight to the first rendering type information and the second weight to the second rendering type information to obtain the third rendering type information. Herein, the first weight can be calculated based on Equation 2 as shown below.

$$1 - \frac{(79 dBSPL - SPL_{est})}{(40 dBSPL)} \quad \text{[Equation 2]}$$

Here, $SPL_{est}$ is a currently set volume level or listening level of the display apparatus 100.

In addition, the second weight can be calculated based on Equation 3 as shown below.

$$\frac{(79 dBSPL - SPL_{est})}{(40 dBSPL)} \quad \text{[Equation 3]}$$

Here, $SPL_{est}$ is a currently set volume level of the display apparatus 100.

Figure 5:
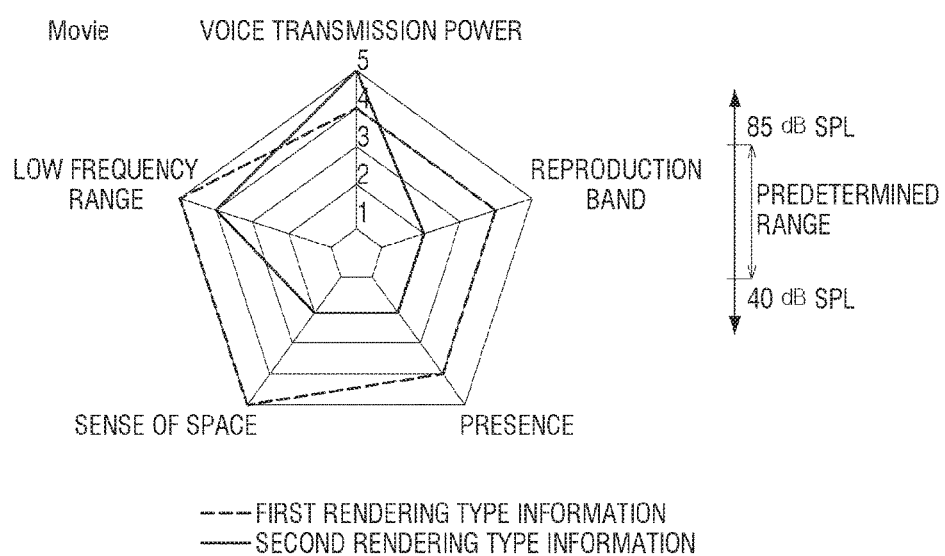
FIGS. 5-7 are views to describe rendering type information and a predetermined volume level range according to contents of various genres.
Figure 6:
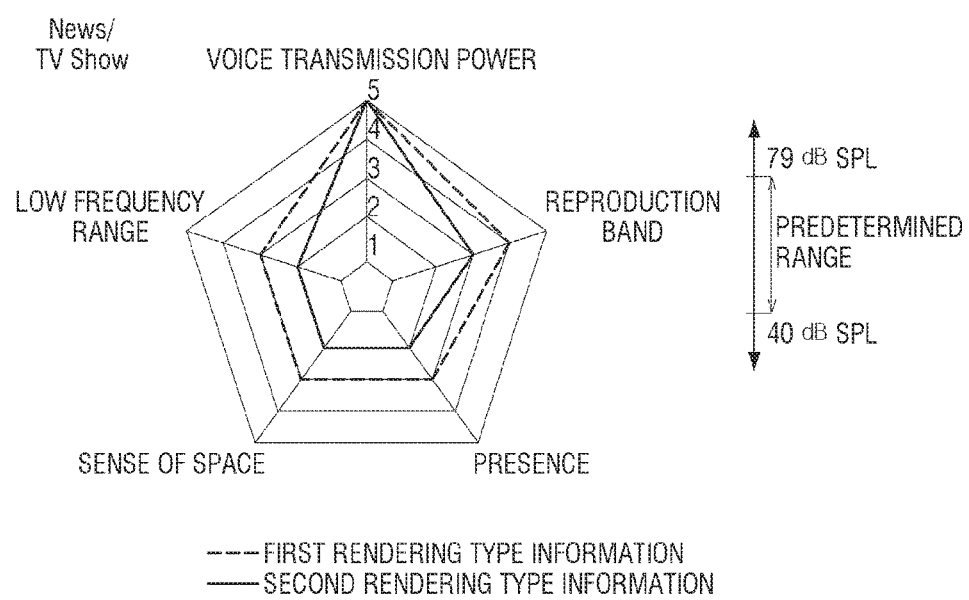
Figure 7:
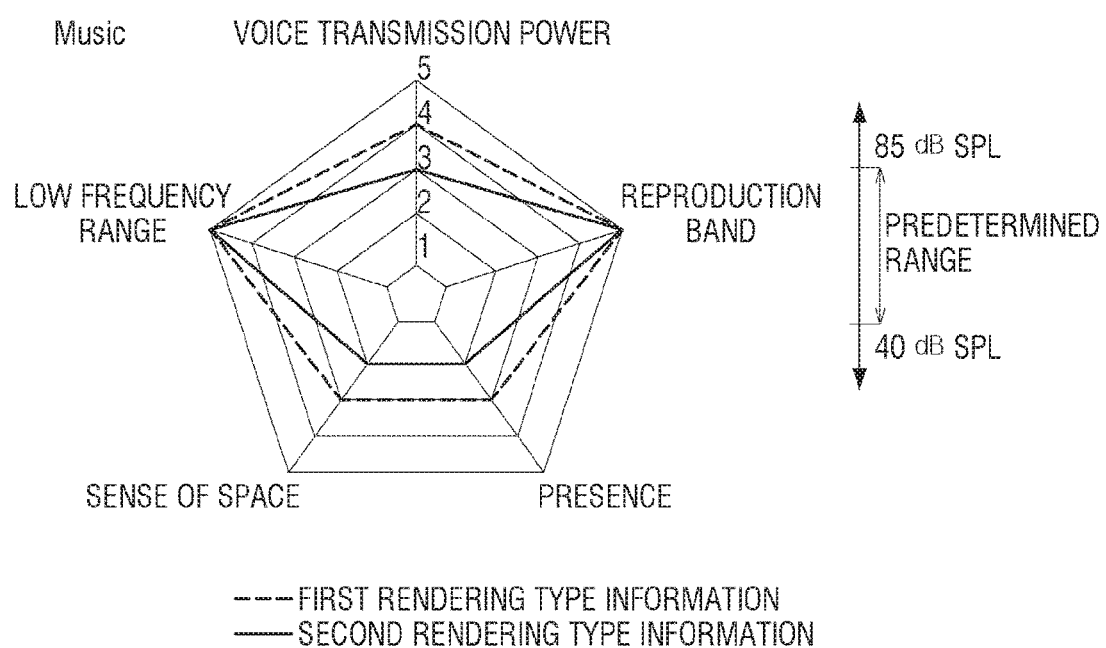

FIGS. 5-7 are views to describe rendering type information and a predetermined volume level range according to contents of various genres.

As illustrated in FIG. 5, the rendering type information of a movie genre content can be divided into the first rendering type information and the second rendering type information. FIG. 4 below shows the first rendering type information of a movie genre according to an exemplary embodiment of the present disclosure.

TABLE 4

| Voice transmission power | Reproduction band | Low frequency range | Sense of space | Presence |
|---|---|---|---|---|
| 4 | 4 | 5 | 5 | 4 |

When the currently set volume level exceeds an upper limit of the predetermined volume level range, the display apparatus 100 may render a sound signal based on rendering type information as shown in Table 4.

In addition, when the currently set volume level of the display apparatus 100 is less than a lower limit of a predetermined volume level range, the display apparatus 100 may render a sound signal based on the rendering type information as shown in FIG. 5.

TABLE 5

| Voice transmission power | Reproduction band | Low frequency range | Sense of space | Presence |
|---|---|---|---|---|
| 5 | 2 | 4 | 2 | 2 |

Also, as described above, when the currently set volume level of the display apparatus 100 is within the predetermined volume level range, the display apparatus 100 applies the first and second weights to the first rendering type information and the second rendering type information to acquire the third rendering type information, and render the sound signal based on the third rendering type information. For example, if the predetermined volume level range of the movie genre is 40 dBSPL to 85 dBSPL, and the currently set volume level of the display apparatus 100 is within 40 dBSPL to 85 dBSPL, then the display apparatus 100 render the sound signal based on the obtained third rendering type information.

As illustrated in FIG. 6, the rendering type information of the news/TV show genre can be divided into the first rendering type information and the second rendering type information. Tables 6 and 7 below show the first and second rendering type information of the news/TV show genre according to an exemplary embodiment of the present disclosure.

TABLE 6

| Voice transmission power | Reproduction band | Low frequency range | Sense of space | Presence |
|---|---|---|---|---|
| 5 | 4 | 3 | 3 | 3 |

TABLE 7

| Voice transmission power | Reproduction band | Low frequency range | Sense of space | Presence |
|---|---|---|---|---|
| 5 | 3 | 2 | 2 | 2 |

As described above, when the currently set volume level of the display apparatus 100 exceeds an upper limit of the predetermined volume level range, the display apparatus 100 may render a sound signal based on the first rendering type information as shown in Table 6. Further, if the currently set volume level of the display apparatus 100 is less than a lower limit of the predetermined volume level range, the display apparatus 100 can render a sound signal based on the second rendering type information as shown in Table 7.

Also, if the currently set volume level of the display apparatus 100 is within the predetermined volume level range, the display apparatus 100 applies the first and second weights to the first and second rendering type information, respectively, to acquire the third rendering type information, and render the sound signal based on the third rendering type information. For example, if the predetermined volume level range of the news/TV show genre is 40 dBSPL to 79 dBSPL and the current set volume level of the display apparatus 100 is within 40 dBSPL to 79 dBSPL, then the display apparatus 100 may render a sound signal based on the third rendering type information.

Figure 8:
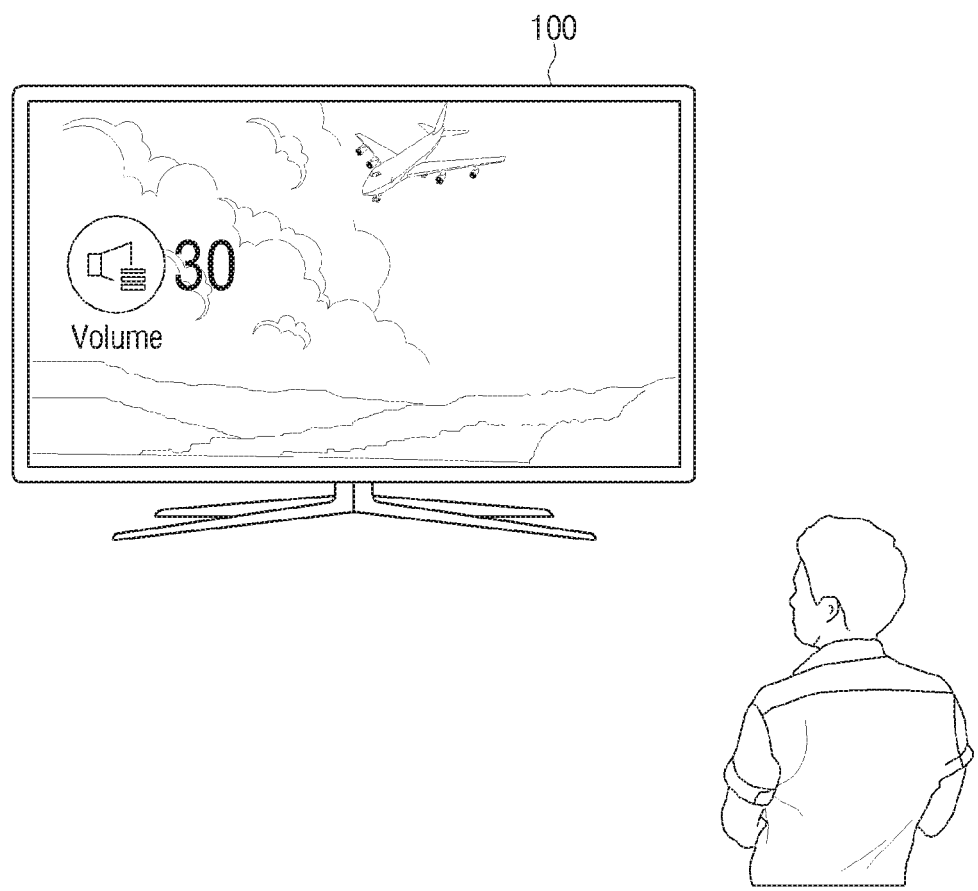
FIG. 8 is a view to describe a listening level of a user according to an exemplary embodiment.
Figure 9:
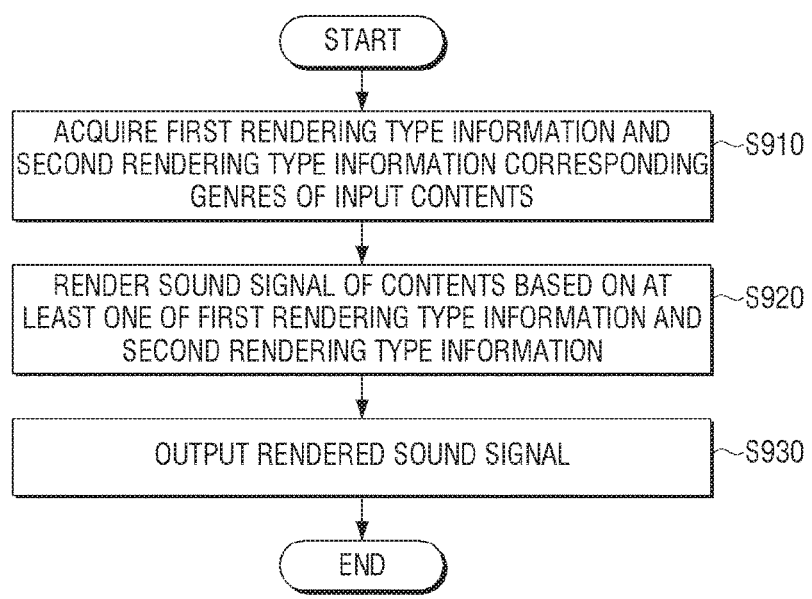
FIG. 9 is a flowchart to describe a controlling method of a display apparatus according to an exemplary embodiment.

As illustrated in FIG. 7, the first and second rendering type information of a music genre content can be shown in FIGS. 8 and 9.

TABLE 8

| Voice transmission power | Reproduction band | Low frequency range | Sense of space | Presence |
|---|---|---|---|---|
| 4 | 5 | 5 | 3 | 3 |

TABLE 9

| Voice transmission power | Reproduction band | Low frequency range | Sense of space | Presence |
|---|---|---|---|---|
| 3 | 5 | 5 | 2 | 2 |

According to an embodiment of the present disclosure, the predetermined volume level range of the music genre is 40 dBSPL to 85 dBSPL, and if the currently set volume level of the display apparatus 100 is within 40 dBSPL to 85 dBSPL, the display apparatus 100 may render a sound signal based on the acquired third rendering type information.

However, the various embodiments of the present disclosure are not limited to the specific values for the rendering type information and the predetermined volume level range described in FIGS. 4 to 7 and Tables 1 to 9, and can be set differently according to various purposes of the present disclosure. For example, the display apparatus 100 may have various rendering type information according to a setting of the user or a setting of the manufacturer of the display apparatus 100. It is needless to say that the genre of the contents can be more subdivided and diversified than the above-mentioned example.

Hereinbelow, an exemplary embodiment of calculating a weight based on a listening level of a user will be described in a greater detail.

FIG. 8 is a view to describe a listening level of a user according to an exemplary embodiment.

As illustrated in FIG. 8, the display apparatus 100 may calculate a weight based on the currently set volume level and listening level.

Although the display apparatus 100 outputs the sound signal according to the volume level currently set in the display apparatus 100, the level of the sound signal recognized by the user's hearing system may be different from the set volume level.

According to the equal loudness contours showing the relationship between the sound pressure level and the frequency of the sound signal, even when the sound signal has the same decibel, the size of the sound perceived by the user differs depending on the frequency of the sound signal. That is, the intensity of the physically measured sound does not match the size of the sound actually perceived through the human auditory system. For example, if you hear 70 dB sound at 50 h and 70 dB at 200 Hz, the human auditory system will perceive 70 dB sound at 200 Hz to be louder. The sound of 60 dB at 1 kHz and 70 dB at 200 Hz will be recognized as the same size.

The display apparatus 100 according to an embodiment of the present disclosure can determine the loudness based on the frequency of the sound signal and the set volume level of the display apparatus 100. Here, loudness refers to the amount of subjective sound perceived by a human auditory system when a sound is delivered to the human ear.

For example, the user's perceived level (loudness) of the output sound signal may vary depending on the average viewing distance of the user to the display apparatus 100, the content viewing time, the size of the sound signal, the surrounding noise level, etc. For example, in the case of general live TV programs, the sound signal is constant in size because it is mixed with an average of −23 loudness k-weighted relative to full scale (LKFS), while other game contents and Internet contents have different average sizes of a sound signal depending on the content, and may not be constant within one content. Accordingly, the display apparatus 100 can calculate a weight based on the listening level according to the size (e.g., loudness) of the subjective sound perceived by the human auditory system.

The display apparatus 100 according to an exemplary embodiment of the present disclosure may detect the ambient noise level and obtain the third rendering type information by further considering the detected ambient noise level. For example, if the ambient noise level exceeds a predetermined level, the volume level currently set on the display apparatus 100 may be different from the user's perception level. For example, the sound signal can be recognized at a level lower than the set volume level. Accordingly, the display apparatus 100 can obtain the third rendering type information by setting the second weight to a value relatively greater than the first weight. However, the present disclosure is not limited thereto, but it is needless to say that the third rendering type information can be obtained by setting the first weight to a relatively greater value than the second weight.

In addition, according to an embodiment of the present disclosure, the display apparatus 100 may acquire the third rendering type information in consideration of the viewing time. For example, in a particular time period (e.g., evening and early morning hours) when the human auditory system is sensitive to sound signals, a first weight that is applied to the first rendering type information and a second weight that is applied to the second rendering type information can be calculated differently from the daytime time zone. For example, in the evening and early morning hours, the first weight may be set to a relatively greater value than the second weight to obtain third render type information. However, the present disclosure is not limited to this, and it is also possible to set the second weight to a relatively large value.

FIG. 9 is a flowchart to describe a controlling method of a display apparatus according to an exemplary embodiment.

According to the controlling method of the display apparatus in which the first rendering type information and the second rendering type information based on the volume level are stored for each content genre shown in FIG. 9, the first rendering type information and the second rendering type information corresponding to the genre of the content are obtained in step S910.

Based on at least one of the first rendering type information and the second rendering type information, the sound signal of the content is rendered in step S920.

Then, the rendered sound signal is output in step S930.

In step S920, when the volume level currently set in the display apparatus 100 is within a predetermined range, the sound signal of a content is rendered based on the third rendering type information which is obtained by applying a weight according to a set volume level to at least one of the first rendering type information and the second rendering type information.

In the rendering step of S920, when the set volume level exceeds an upper limit of the predetermined range, the sound signal is rendered based on the first rendering type information. If the set volume level is less than a lower limit of the predetermined range, it is possible to render the sound signal based on the second rendering type information.

If the set volume level is within the predetermined range, the first weight is applied to the first rendering type information and the second weight is applied to the second rendering type information to obtain the third rendering type information based on the set volume level, in step S920.

If it is determined that the set volume level is within a predetermined range, the second weight value is set to a value greater than the first weight value when the set volume level approaches the lower limit relatively to the upper limit of the predetermined range in step S920. If it is determined that the set volume level is within a predetermined range, the first weight can be set to a value greater than the second weight when the set volume level approaches the upper limit relatively to the lower limit of the predetermined range in step S920.

In addition, the display apparatus 100 stores information on a predetermined range for each content genre. In the rendering of the S920, the predetermined range corresponding to the genre of the content can be identified based on the stored information.

Also, in the rendering step of S920, a weight can be obtained based on the set volume level and the listening level. Here, the listening level may be obtained based on at least one of the average viewing distance of the user to the display apparatus, the viewing time, the size of the sound signal, and the ambient noise level.

Meanwhile, each of the first rendering type information and the second rendering type information may be parameter information for adjusting at least one of a voice transmission power, a low frequency range, a reproduction band, a sense of space and presence.

In addition, the genre information can be included in a content or obtained based on a sound signal.

The methods according to various exemplary embodiments can be implemented only by software upgrade or hardware upgrade with respect to the existing display apparatus.

In addition, the aforementioned various exemplary embodiments can be performed at an embedded server in a display apparatus or an external server of a display apparatus.

Meanwhile, the various embodiments described above can be implemented in a recording medium that can be read by a computer or a similar device using software, hardware, or a combination thereof. In some cases, the embodiments described herein may be implemented by the processor itself. According to software implementation, embodiments such as the procedures and functions described herein may be implemented in separate software modules. Each of the software modules may perform one or more of the functions and operations described herein.

Meanwhile, computer instructions for performing the processing operations according to various embodiments of the present disclosure described above may be stored in a non-transitory computer-readable medium. Computer instructions stored in such non-volatile computer-readable media may cause a particular device to perform processing operations according to various embodiments described above when executed by a processor.

The non-transitory computer-recordable medium is not a medium configured to temporarily store data such as a register, a cache, or a memory but an apparatus-readable medium configured to semi-permanently store data. Specifically, the above-described various applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and provided therein.

The foregoing exemplary embodiments and advantages are merely exemplary and are not to be construed as limiting the inventive concept. The exemplary embodiments may be readily applied to other types of device or apparatus. Also, the description of the exemplary embodiments is intended to be illustrative, and not to limit the scope of the inventive concept, and many alternatives, modifications, and variations will be apparent to those skilled in the art.

What is claimed is:

1. A display apparatus comprising:
    a speaker;
    a storage configured to store first rendering type information and second rendering type information based on a volume level of each content genre;
    a display; and
    a processor configured to:
    render a sound signal of a content displayed on the display based on at least one of the first rendering type information and the second rendering type information corresponding to a genre of the content, and
    output the rendered sound signal through the speaker,
    wherein the processor is further configured to, based on a set volume level in the display apparatus being within a predetermined range, render the sound signal based on third rendering type information which is obtained by applying a weight according to the set volume level to at least one of the first rendering type information and the second rendering type information.

2. The display apparatus of claim 1, wherein the processor is configured to:
    based on the set volume level exceeding an upper limit of the predetermined range, render the sound signal based on the first rendering type information, and
    based on the set volume level being less than a lower limit of the predetermined range, render the sound signal based on the second rendering type information.

3. The display apparatus of claim 1, wherein the processor is configured to, based on the set volume level being within the predetermined range, obtain the third rendering type information by applying a first weight to the first rendering type information and a second weight to the second rendering type information based on the set volume level.

4. The display apparatus of claim 3,
wherein the processor is configured to:
based on the set volume level being within the predetermined range and approaching to a lower limit of the predetermined range relative to an upper limit of the predetermined range, set the second weight to be greater than the first weight, and
based on the set volume level being within the predetermined range and approaching to the upper limit of the predetermined range relative to the lower limit of the predetermined range, set the first weight to be greater than the second weight.

5. The display apparatus of claim 1, wherein information regarding the predetermined range of each content genres is stored in the storage, and
wherein the processor identifies the predetermined range which corresponds to a genre of the content based on the stored information.

6. The display apparatus of claim 1, wherein the processor obtains the weight based on the set volume level and a hearing level, and
wherein the hearing level is obtained based on at least one of an average viewing distance of a user to the display apparatus, a content viewing time, a size of the sound signal, and an ambient noise level.

7. The display apparatus of claim 1, wherein each of the first rendering type information and the second rendering type information is parameter information to adjust at least one of a voice transmission power, a low frequency range, a reproduction band, a presence, and a sense of space.

8. The display apparatus of claim 1, wherein the genre of the displayed content is included in the content or obtained based on the sound signal.

9. A controlling method of a display apparatus in which first rendering type information and second rendering type information based on a volume level of each content genre is stored therein, the method comprising:
obtaining first rendering type information and second rendering type information corresponding to a genre of an input content;
rendering a sound signal of the content based on at least one of the first rendering type information and the second rendering type information; and
outputting the rendered sound signal,
wherein the rendering comprises:
based on a set volume level in the display apparatus being within a predetermined range, rendering the sound signal based on third rendering type information which is obtained by applying a weight according to the set volume level to at least one of the first rendering type information and the second rendering type information.

10. The method of claim 9, wherein the rendering comprises:
based on the set volume level exceeding an upper limit of the predetermined range, rendering the sound signal based on the first rendering type information, and
based on the set volume level being less than a lower limit of the predetermined range, rendering the sound signal based on the second rendering type information.

11. The method of claim 9, wherein the rendering comprises, based on the set volume level being within the predetermined range, obtaining the third rendering type information by applying a first weight to the first rendering type information and a second weight to the second rendering type information based on the set volume level.

12. The method of claim 11, wherein the rendering comprises, based on the set volume level being within the predetermined range and approaching to a lower limit of the predetermined range relative to an upper limit of the predetermined range, setting the second weight to be greater than the first weight, and based on the set volume level within the predetermined range and approaching to the upper limit of the predetermined range relative to the lower limit of the predetermined range, setting the first weight to be greater than the second weight.

13. The method of claim 9, further comprising storing information regarding the predetermined range of each content genres, wherein the rendering further comprises identifying the predetermined range which corresponds to a genre of the content based on the stored information.

14. The method of claim 9, wherein the rendering comprises obtaining the weight based on the set volume level and a hearing level, and
wherein the hearing level is obtained based on at least one of an average viewing distance of a user to the display apparatus, a content viewing time, a size of the sound signal, and an ambient noise level.

15. The method of claim 9, wherein each of the first rendering type information and the second rendering type information is parameter information to adjust at least one of a voice transmission power, a low frequency range, a reproduction band, a presence, and a sense of space.

16. The method of claim 9, wherein the genre of the displayed content is included in the content or obtained based on the sound signal.

17. A non-transitory computer-readable medium which stores a computer instruction to cause a display apparatus to perform processing operations when executed by a processor, wherein the processing operations comprise:
obtaining first rendering type information and second rendering type information corresponding to a genre of an input content;
rendering a sound signal of the content based on at least one of the first rendering type information and the second rendering type information,
wherein the rendering comprises, based on a set volume level in the display apparatus being within a predetermined range, rendering the sound signal based on third rendering type information which is obtained by applying a weight according to the set volume level to at least one of the first rendering type information and the second rendering type information.

\* \* \* \* \*